United States Patent [19]

Harper

[11] 4,420,836
[45] Dec. 13, 1983

[54] LASER RESONATOR

[75] Inventor: Lawrence L. Harper, Monroe, La.

[73] Assignee: The United States of America as represented by the Administrator of the National Aeronautics and Space Administration, Washington, D.C.

[21] Appl. No.: 270,763

[22] Filed: Jun. 5, 1981

[51] Int. Cl.³ .............................................. H01S 3/08
[52] U.S. Cl. .................................. 372/98; 372/100; 372/108; 372/93; 372/94; 350/299; 356/345
[58] Field of Search ............... 372/100, 101, 108, 93, 372/94, 98; 350/299, 284, 286; 356/345, 352

[56] References Cited

U.S. PATENT DOCUMENTS

| | | | |
|---|---|---|---|
| 2,841,049 | 7/1958 | Scott | 356/345 |
| 3,109,049 | 10/1963 | Williams | 356/345 |
| 3,464,026 | 7/1969 | Woodbury et al. | 372/100 |
| 3,508,166 | 4/1970 | Simmons et al. | 372/100 |
| 3,924,201 | 12/1975 | Crow | 372/100 |
| 4,065,732 | 12/1977 | Scammell | 372/93 |
| 4,099,141 | 7/1978 | Leblanc et al. | 372/93 |

Primary Examiner—James W. Davie
Assistant Examiner—Léon Scott, Jr.
Attorney, Agent, or Firm—Robert E. Bushnell; John O. Tresansky; John R. Manning

[57] ABSTRACT

An optical resonator cavity configuration 10 using a unitary mirror 50 with oppositely directed convex reflective surface 52 and concave reflective surface 54 disposed into one fold and concertedly reversing both ends of a beam propagating from a laser rod 20 disposed between two total internal reflection prisms 30, 32 rigidly positioned with perpendicularly crossed virtual rooflines 35, 37 by a compact optical bed 80. The rooflines 35, 37 of the internal reflection prisms 30, 32 are arranged perpendicularly to the axis of the laser beam and to the optical axes of the optical resonator components.

18 Claims, 4 Drawing Figures

4,420,836

LASER RESONATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to molecular and particle resonant type oscillators and, more particularly, to the feedback loops of laser resonator cavities.

BACKGROUND ART

An increasing demand for accuracy in such diverse fields as geophysical measurement (e.g., land surveying) and long distance communication (e.g., electro-optic communication networks) has created a need for a laser transmitter capable of accurately projecting a beam to a distant reflector. Often, such systems are in continuous use in remote locations. It is, therefore, essential that the subsystems of the transmitter, particularly the resonator cavity, have a long lifetime, high reliability and minimum power consumption. Additionally, the frequent use of such systems in mobile applications makes it desirable for the principal subsystems, particularly the resonator cavity, to be small in volume and mass.

In its simplest form, the optical feedback loop for a resonator cavity of an optically pumped laser transmitter is an active laser medium, such as a crystalline rod, made optically resonant by a pair of reflecting surfaces placed at either end of the medium. Both of the reflecting surfaces and the laser medium are usually attached by mounting fixtures to a common optical bed for stability. The reflectors need not be plane mirrors, but must be aligned so that multiple reflections occur. Consequently, such a resonator cavity is very sensitive to changes in alignment between the laser medium and the mirrors. A slight tilt of one mirror, for example, creates a misalignment between the medium and the mirror which subjects the resonator cavity to a high loss of energy. Typically, a misalignment of three-tenths of a milliradian in the resonator cavity can prevent operation of a laser transmitter. Additionally, the likelihood of misalignment losses is increased by two techniques commonly used to increase the radiated power of a resonator cavity.

In one technique, the degree of resonance achieved by an optical cavity is enhanced with a Q-switch, an active component. A Q-switch operates to retard stimulated emission by interrupting oscillation in the resonant cavity. Then, when a very high level of inversion is reached in the laser medium, the Q-switch is triggered to suddenly restore the resonant cavity. A Q-switch is susceptible to damage by divergence of the laser beam; therefore, its performance, and, in turn, that of the laser transmitter, is degraded by either misalignment or dimensional instability within the resonator cavity. The second technique, mode-locking, forces the different wavelengths (i.e., "spectral modes") oscillating in the resonator cavity to interact so that they all have the same relative phase. This means that a mode-locked, optically pumped laser propagates a series of short pulses separated by a time lapse of one round trip transit time of the beam inside the resonator cavity. Consequently, any variation in the distance between the reflecting surfaces, such as may be caused by dimensional instability, will create interference and reduce the peak power.

Previous efforts to improve dimensional stability and alignment insensitivity have included the use of concave mirrors, opposite corner cube prisms tilted against correlative Brewster angles, and internal reflection prisms arranged with either parallel or obliquely crossed rooflines, as reflective surfaces.

A total internal reflection prism may have either a real or a virtual roofline. A total internal reflection prism with a real roofline, sometimes referred to as a Porro prism, is a prism having a right triangular cross-section. The edge running along the right angle is the "roofline." The prism provides total reflection of light incident to a face opposite a 45° angle when the light is sufficiently parallel so that all of the light strikes the reflecting face outside of the critical angle. A total internal reflection prism with a virtual roof-line is a prism with a trapezoidal cross-section having 45°-45°-135°-135° included angles; in effect, a real roofline prism from which the roofline edge has been truncated. A virtual roofline prism reflects light incident to a face included between 45° and 135° angles when the light is sufficiently parallel such that all of the light strikes the reflecting face outside the critical angle. Laser energy is coherent, and therefore a light beam emitted by a lasing medium can be totally reflected by a total internal reflection prism, albeit with a small translation within the plane of, but normal to, the light beam. There is an 180° angular change between the reflected light and the incident light because a total internal reflection prism reflects light through two 90° internal angles.

Although the use of mirrors and prisms resulted in devices with improved characteristics those devices tended to be either subject to dimensional changes affecting other resonator cavity components, limited to misalignment insensitivity only along a single axis, or larger in size than can be conveniently incorporated into the compact volume of a resonator cavity. It is, therefore, apparent that the accuracy, reliability and lifetime of a laser transmitter (particularly a Q-switched, mode-locked, optically pumped laser) will be enhanced if the resonator cavity can be made dimensionally stable and insensitive to misalignment.

STATEMENT OF INVENTION

Accordingly, it is one object of the present invention to provide an improved optical feedback apparatus.

It is a second object to provide a feedback apparatus which is insensitive to misalignment between its optical components.

It is another object to provide a feedback apparatus which improves the reliability of the resonator cavity.

It is still another object to provide a feedback apparatus which is dimensionally stable.

It is yet another object to provide a feedback apparatus which enhances the dimensional stability of a resonator cavity.

It is still yet another object to provide a feedback apparatus which enhances the lifetime of a resonant cavity.

It is a further object to provide a feedback apparatus which enhances the misalignment insensitivity and dimensional stability of a cavity without impairing the compactness of the cavity.

It is still further object to provide a feedback apparatus which renders a resonant cavity insensitive to changes in optical alignment between its several elements.

It is a yet further object to provide a feedback apparatus free of etalon effects.

Another yet further object is to provide an optical feedback apparatus which is dimensionally stable in an environment of changing ambient temperatures, vibration, and shock.

These and other objects are achieved by a feedback loop using a unitary common mirror with oppositely directed reflective faces of opposite sign positioned to terminate opposite ends of a beam propagating along multiple folds between a facing pair of total internal reflection prisms with orthogonally crossed rooflines. Typically, both ends of the beam are folded 180° by the prisms into two spaced apart, parallel paths. One end of the beam is subsequently folded twice again by alternative prisms and travels along a final path in common with the other end of the beam to impinge upon opposite faces of the common mirror. A rigid optical bed of a material exhibiting a low coefficient of thermal expansion holds the prisms mutually fixed as part of the resonator cavity of a mode locked, Q-switched, laser transmitter and oriented toward different surfaces of the mirror.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like numbers indicate the same or similar components, wherein.

DETAILED DESCRIPTION OF THE INVENTION

Figure 1:
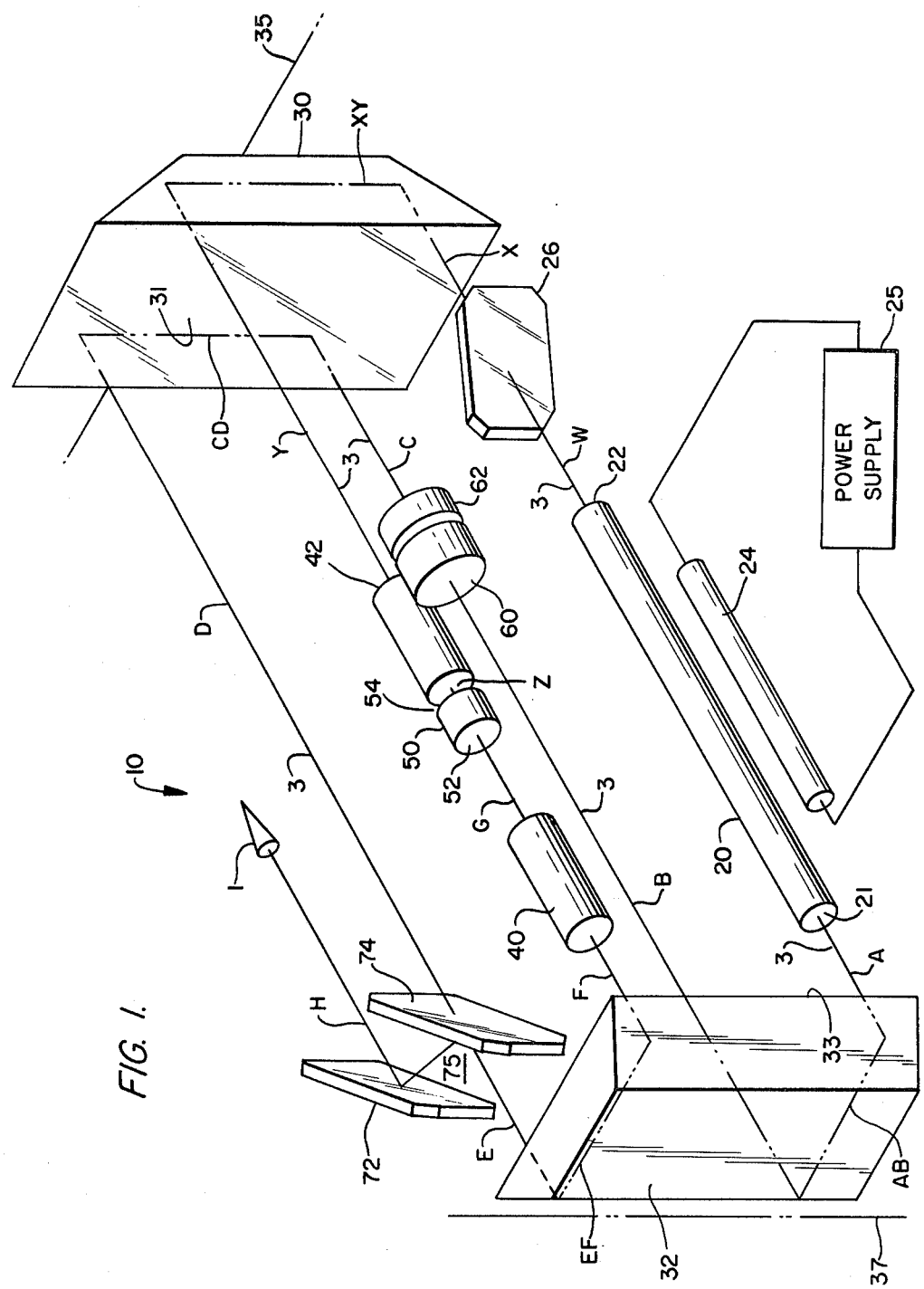
FIG. 1 is an isometric view of the configuration of an optical oscillator.

Referring to the drawings and in particular, to FIG. 1, the optical components of a mode locked, Q-switched, cavity dumped laser resonator cavity 10 are shown incorporated into the resonator of an optically pumped laser. A solid-state laser rod 20 of a material such as neodymium-yttruim-aluminum-garnet or chromium-aluminum-oxide is optically pumped by a source such as an incandescent lamp, a continuous-wave arc lamp, or a flashlamp 24 driven by a power supply 25, to produce a population inversion in the laser rod. A pair of total internal reflector prisms 30, 32 with perpendicularly crossed virtual rooflines 35, 37, are mounted, spaced apart from either end of laser rod 20. Preferably, prisms 30, 32 are nearly identical in size and shape. The virtual rooflines of prisms 30, 32 are preferably perpendicular so as to fold a beam of light 3 emanating from both ends of 21, 22 of rod 20 a finite number of times into nearly parallel rays AG and WZ. Both ends of the beam propagated by laser rod 20, represented by ray traces AG and WZ respectively, are initially folded 180° by prisms 32, 30, respectively, emerging as ray traces B and Y, respectively. Ray trace Y is directed into a KD*P (deuterated potassium phosphate) modelocker 42 and emerges as ray trace Z. Mode lock cell 42 provides a phased relation between all of the longitudinal modes of ray traces Y and Z. Ray trace B is directed through a pair of quartz alignment wedges 60, 62, emerging as ray trace C, which in turn, is directed into the opposite prism 30 where it is again folded 180° to emerge as ray trace D. Ray trace D passes through a beam-splitter component 74 of a dielectric polarizer 75, to emerge as ray trace E which is directed into prism 32. Ray trace E is folded 180° by prism 32; it emerges as ray trace F, which passes into a KD*P Q-switch 40, and emerges as ray trace G.

Ray traces G and Z, which are oppositely propagating in different directions along a nearly coaxial common fold of the optical path FY, impinge upon opposite reflective surfaces 52, 54, respectively, of common mirror 50 whereupon ray traces G and Z retrace the paths of both ends GA and ZW, respectively, of the optical path. The intensity of ray trace E is divided by beam splitter 74 into rays E and H. The diverted beam H is reflected outside of the resonator cavity as a coherent beam of light 1 by a mirror component 72 of dielectric polarizer 75. The optical axes of the optical components are essentially parallel to the single ray traces AW, X, B, C, FG, YZ, E, and D used to represent the beam path. The virtual rooflines 35, 37 of prisms 30, 32, respectively, are perpendicular to each other. Virtual rooflines 35, 37 are also nearly perpendicular to all of the ray traces external to prisms 30, 32. Roofline 35 is perpendicular to ray traces XY, CD internal to prism 30 and parallel to ray traces AB, EF internal to prism 32, while roofline 37 is perpendicular to ray traces AB, EF internal to prism 32 and parallel to ray traces XY, CD internal to prism 30. Reflecting both ends of a coherent beam of light between the two total internal reflection prisms 30, 32 with orthogonally crossed rooflines, permits one prism to cancel angular deviations from a first axis parallel to one roofline while the other prism cancels angular deviations from an axis parallel to the other roofline and normal to the first axis. In effect, any angular deviation of a beam is converted into a small positional change.

The common mirror 50 terminates both ends of the resonator optical path. It is a cylindrical unitary glass mirror blank with a polished dielectric coating on opposite bases. Opposite reflective surfaces 52, 54 formed by coating are parallel, have focal lengths of opposite sign and are preferably spherical. Either one of the reflective surfaces 52, 54 may be concave while the other surface is convex. Ideally, reflective surfaces 52, 54 have centers of curvature on a common axis passing through the centers of both mirrors. The convex reflective surface 52 is preferably oriented opposite one face of Q-switch 40 while the concave surface 54 is oriented opposite the adjacent face of modelocker 42. Reversal of the common mirror is possible because it simply reverses the reflected image sizes.

In the working model of the structure shown in FIG. 1, common mirror 50 was made of a crown quality optical glass cylinder with reflective surfaces 52 ground concave and reflective surface 54 ground convex and parallel to surface 52. The least distance between reflective surfaces 52, 54 was uniformly 0.312 inches. High reflectivity aluminum coatings were applied to both surfaces 52, 54.

Etalon effects in a resonator cavity limit the spectral width of the laser radiation and make it extremely difficult to obtain the desired pulsewidth. Four precautions are available to avoid etalon effects. First, every element in the resonator cavity, except mirror 72, may be designed as a wedge. Second, the quartz total internal reflection prisms 30, 32 may have individual internal pyramidal errors so that for any ray trace, the entrance faces on surfaces 31, 33 are not entirely parallel to the corresponding exit faces on surfaces 31, 33 of the opposite prism. Third, all optical surfaces, except the two sets of optical surfaces of total internal reflection prisms 30, 32 are set between 0.20° and 0.25° off every other optical surface. Fourth, the surfaces 31, 33 of prisms 30, 32, respectively, are tilted sufficiently and far enough apart to eliminate the interference effects of an established etalon. In practice, establishment of an etalon between prisms 30, 32 is improbable because of the optical tolerance of intervening optical components.

The laser rod 20 leg of resonator cavity 10 includes quartz wedge 26 to compensate for deviation and lateral offset introduced by the wedged radiant surfaces 21, 22 of laser rod 20. Q-switch 40 and modelock cell 42 may be made structurally identical and mounted so that deviation and lateral offset of one cell is compensated for by the other cell. Dielectric polarizer 75, internal to the resonator cavity, may also be designed as an optical wedge. The two quartz Risley wedges 60, 62 (i.e., two wedge shaped prisms rotatable with respect to each other) compensate for both the axial offset and angular deviation of dielectric polarizer 75. Additionally, Risley wedges 60, 62 may include a range of offset and deviation sufficient to compensate for the cumulative fabrication tolerance of all the optical components of resonator cavity 10.

Figure 2:
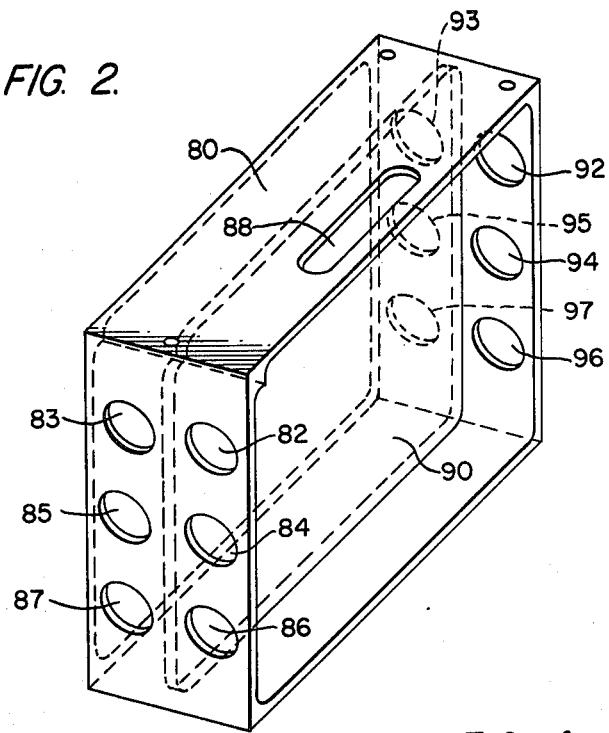
FIG. 2 is an isometric view of an optical bed.

A degree of mechanical and thermal stability is necessary between the optical components of resonator cavity 10 configuration particularly if resonator cavity 10 includes active modelocking because modelocking depends upon stringent constancy in the optical length of resonator cavity 10. Minor deviations between the perpendicularlity of rooflines 35, 37, for example, must be confined to less than thirty minutes of arc. FIG. 2 shows an optical bed 80 made of Invar, i.e., a nickel alloy, suitable for providing stability between the various optical components. Optical bed 80 is a rigid, unitary four-sided rectangular box with two open-sided compartments separated by a solid central interior floor 90 perpendicular to all sides. The optical bed may be fabricated from a block of free-machining Invar-36.

The substantial machining required necessitates stress-relief heat treatments. One-treatment would have an Invar block first machined to 0.06 inches oversize in its major dimensions, heat-treated for one hour at 1200° F., then slowly cooled. After cooling, the block would be machined to 0.03 inch oversize in its major dimensions, heat-treated for one hour at 1200° F., and slowly cooled. The block would be machined to its final dimensions with all of the details shown in FIG. 2, and then subjected to a final heat treatment for one hour at 600° F. An acid treatment of the bed may be performed to remove oxidation elements resulting from the final heat treatment; the bed may then be nickel plated to prevent future oxidation.

One optical bed fabricated according to the suggested procedure for an optical cavity length (with four folds) of 120 centimeters contained a 0.5 inch trick bed 90 and walls 0.1875 inches thick by 1.25 inches high. Mounts fastened to the sides of the bed held the optical components so that the laser beam was about 0.75 inches off the bed. A mechanical and thermal stress analysis performed on this optical bed indicated a dimensional and distortion stability approaching that of the Invar material with a thermalexpansion coefficient of $10^{-6}$ inches per inch per degree Celsius.

Figure 3:
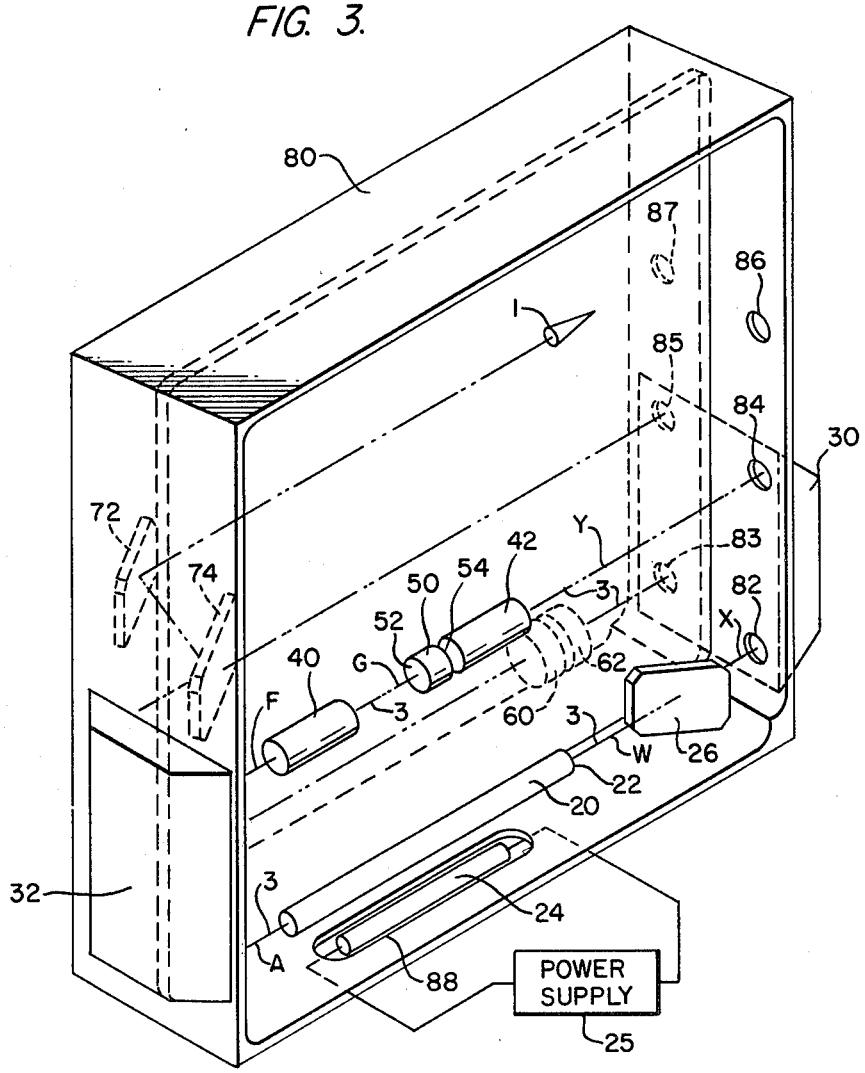
FIG. 3 is an isometric view of the optical bed of FIG. 2 disposed about the elements of the optical oscillator of FIG. 1.

FIG. 3 isometrically illustrates the optical components of cavity resonator shown in FIG. 1 superimposed upon the optical bed 80 of FIG. 2. Prisms 30, 32 are rigidly mounted on the outside surface of opposite sides of the optical bed with metal clamps and rubber pads (not shown). Ports 82, 83, 84, 85 and 92, 93, 94, 95 in the opposite sides of the optical bed allow passage of the beam between the optical components inside the cavity and total internal reflection prisms 30, 32. Oblong port 88 permits light energy from externally mounted flashlamp 24 to pump laser rod 20. Central floor 90 holds the four sides of the optical bed rigidly apart and provides a convenient surface for mounting laser rod 20, wedge 28, Q-switch 40, common mirror 50, and mode locker 42 from Risley wedges 60, 62 and dielectric polarizer 75.

Figure 4:
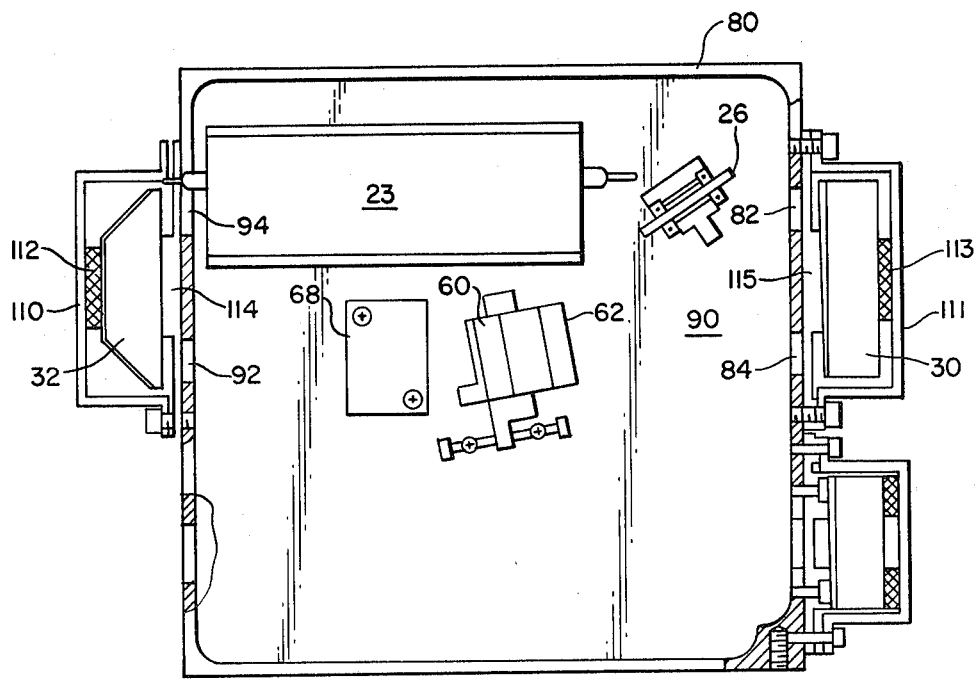
FIG. 4 is a front view of one mode for mounting optical components to a stable optical bed.

FIG. 4 shows the details for mounting the optical components to the optical bed 80. The prisms 30, 32 shown in FIG. 4 were each designed to have a 1.5° internal error to avoid etalon effects, thereby necessitating the entrance surface 31, 33 of each prism to be titled by 2.175° with respect to the path of optical beam 3 to provide alignment. Metal clamps 110, 111 hold prisms 32, 30, respectively, rigidly against opposite sides of optical bed 80, between rubber shock pads 112, 113 and Invar pads 114, 115. Invar pads 114, 115 are located to avoid induced stress along the beam paths through the prisms. Invar pads 114, 115 are fabricated as wedges, with an angle of about 2.175° between entrance and exit surface planes, on the assumption that opposite ends of bed 80 are precisely perpendicular to the beam paths. In practice, fabrication errors associated with prisms 30, 32 and optical bed 80 required slightly different wedge angles for Invar pads; these angles could be determined only through optical measurement. An optical polish of both sides of Invar pads 114, 115 and the adjoining exterior opposite surfaces of bed 80 to quarter wavelength flatness under sodium light assures accuracy of alignment. A second machining operation may be required for Invar pads 114, 115; this machining and subsequent repolishing to quarter wavelength flatness provides an accuracy better than ten arc seconds. Common mirror 50 is bonded into a stainless steel holder (not shown) which, in turn, is clamped into an adjustable mount with a three ball kinematic support providing a pitch and yaw range of ten milliradians with four tenths of a milliradian resolution.

There has been disclosed a compact optical feedback loop for a laser resonator cavity using crossed roofline prisms to provide multiple folds of a propagating beam. A unitary mirror with oppositely directed reflective surfaces of opposite sign positioned between opposite ends of the beam enhances the insensitivity of the resonator cavity to misalignment. Attachment of the optical components of the cavity to a rigid, unitary optical bed of a material demonstrating a low thermal coefficient of expansion provides a resonator cavity that is dimensionally stable once aligned. Although the disclosed embodiments show distribution of light energy over only a single spatial mode, this invention is usable for multiple spatial modes. It is to be understood that the terms "light," "laser beam" and "laser energy" are used in this application not as limited to the visible spectrum of electromagnetic radiation, but in the broad sense of radiant energy.

It will be appreciated that all those changes and modifications which fall fairly within the scope of the invention shall be a part thereof. For example, one or both of the total internal reflection prisms illustrated may be replaced with internal reflection prisms having actual rather than virtual rooflines. Similarly, the crystalline laser rod may be replaced with either a glass or a gas laser tube without departing from these teachings.

I claim:

1. A feedback configuration in an optical instrument, comprising:
   a plurality of oppositely disposed means for folding opposite ends of a beam of electro-magnetic energy into a plurality of spaced apart paths, each of said folding means in a terminal relation with all of said paths; and
   unitary means interposed into one of said paths, for concertedly reversing the directions of the opposite ends of said beam along said paths.

2. The configuration of claim 1 wherein said reversing means comprises a structure having a pair of curved reflecting surfaces oriented toward different ones of said oppositely disposed folding means.

3. A feedback configuration in an optical instrument, comprising:
   a plurality of prisms disposed with crossed rooflines in facing pairs for folding into a plurality of spaced apart paths a beam of electromagnetic energy with opposite ends propagated in opposite axial directions; and
   means including a plurality of curved reflective surfaces for concertedly reversing the directions of the opposite ends of said beam along said paths, interposed between one of the pairs of prisms.

4. The configuration of claims 1 or 2 wherein said reversing means is disposed between said folding means.

5. The configuration set forth in claims 2 or 3 wherein each of said prisms is impinged upon by all of said paths.

6. The configuration of claims 1 or 3 wherein said reversing means is interposed in a path common to the opposite ends of the beam.

7. The configuration of claims 1, 3 or 2 wherein said reversing means comprises a unitary structure having a concave reflective surface parallel to and oppositely oriented from a convex reflective surface.

8. The configuration of claim 7 wherein both reflective surfaces have centers of curvature on an axis normal to said rooflines.

9. The configuration of claims 3 or 2 wherein said crossed rooflines are nearly perpendicular to all of said paths external to said prisms.

10. A feedback configuration in an optical instrument, comprising:
    means for producing a beam of electromagnetic energy with opposite ends emanating along opposite axial directions of propagation;
    a pair of total internal reflection prisms disposed with crossed rooflines and facing major surfaces receptive to and folding the opposite ends into a plurality of spaced apart parallel paths, each of said prisms associated with all of said paths; and
    means for reversing the directions of propagation along said paths, with curved reflective surfaces of opposite sign interposed into one of said paths common to said opposite ends, said reflective surfaces being oppositely directed towards different ones of the prisms.

11. A feedback configuration in an optical instrument, comprising:
    a laser rod (20) having oblique radiant surfaces (21, 22) projecting opposite ends (AG/WZ) of a beam (3) of electromagnetic energy;
    a first total internal reflection prism (93) having a roofline (37) perpendicularly disposed to said opposite ends (AG/WZ) of said beam (3), and a major translucent face (33) receptively positioned adjacent one of said radiant surfaces (21) to fold one end (A) of said beam (3) by 180° into a first folded path (BC);
    wedge means (26) interposed into said beam (3) adjacent the other of said radiant surfaces (22) for compensating for offset introduced by said oblique radiant surfaces;
    a second total internal reflection prism (30) spaced apart opposite said laser rod (20) from said first prism (32) and having a roofline (35) disposed transversely to said roofline (37) of said first prism (32) and to said opposite ends (A/W) of said beam (3), and a major translucent face (31) receptively positioned adjacent to said wedge (26) means to fold the opposite end (W) of said beam (3) by 180° into a second folded path (YZ), and to fold said first folded path (BC) into a third folded path (DE) incident upon and folded by 180° by said first prism (32) into a fourth folded path (FG);
    a common mirror (50) having parallel concave and convex spherical reflective surfaces (52/54) interposed into said beam (3) between said first and second prisms (30/32) along one of said folded paths common to both of said opposite ends (AG/WZ) of said beam (3);
    a modelock cell (42) interposed into said beam (3) between said first and second prisms (30/32) and adjacent one of said spherical reflective surfaces (52/54) in axial alignment with one of said folded paths;
    a Q-switching cell (40) interposed into said beam (3) between said first and second prisms (30/32) and adjacent the other of said spherical reflective surfaces (52/54) in axial alignment with one of said folded paths;
    a pair of dielectric polarizer elements (72/74) disposed between said first and second prisms (30/32) with one of said polarizer elements (74) interposed into said beam (3) along any of said folded paths for directing part of the energy of said beam (3) of said feedback configuration via the other of said polarizer elements (72); and
    a pair of mutually rotatable wedge shaped prisms (60/62) interposed into said beam (3) between said first and second prisms (30/32) along any of said folded paths;
    whereby said common mirror (50) is oriented to cause reflection of said opposite ends (AB/WZ) of said beam (3) along said folded paths, thereby establishing continuous optical feedback within said instrument.

12. The configuration of claim 11 wherein said major translucent faces of said first and second prisms (30/32) are nonparallel.

13. The configuration of claim 11 wherein said spherical reflective surfaces have centers of curvature on a common axis.

14. The configuration of claim 11 wherein said common mirror (50) is disposed to allow said second folded path (YZ) and said fourth folded path (FG) to terminate upon different of said spherical reflective surfaces (52/54).

15. The configuration of claim 14 wherein said one of said polarizer elements (74) is interposed into said third folded path (DE).

16. The configuration of claim 14 wherein said Risley wedge prisms (60/62) are interposed into said first folded path (BC).

17. The configuration of claims 11 or 14 wherein:
said configuration additionally includes a unitary structure (80) having a plurality of sides joined by an integral, central floor (90) perpendicularly centered between said sides; and
said laser rod (20) is attached to said central floor.

18. The configuration of claim 17 wherein said structure has at least one pair of said sides disposed in an opposed relation and containing multiple perforations (82, 83, 84, 85/92, 93, 94, 95), said perforations being coincident with paths of said beam (3); and
said prisms (30/32) are rigidly mounted on the exterior of said pair of sides adjoining said perforations.

* * * * *